INVENTOR

FRITHO RUDGER
ERICK MULDER

INVENTOR
FRITHO RUDGER
ERICK MULDER

INVENTOR
FRITHO RUDGER
ERICK MULDER

United States Patent Office 3,353,597
Patented Nov. 21, 1967

3,353,597
FORMATION FLOODING BY SULPHUR DIOXIDE FOR RECOVERING OIL AND GAS
Fritho R. Erick Mulder, Calgary, Alberta, Canada, assignor to Home Oil Company Limited, Alberta, Canada, a corporation of Canada
Continuation of application Ser. No. 350,838, Mar. 10, 1964. This application Jan. 16, 1967, Ser. No. 609,682
Claims priority, application Canada, Sept. 4, 1963, 883,813
12 Claims. (Cl. 166—9)

ABSTRACT OF THE DISCLOSURE

A secondary recovery method comprising the first step of injecting sulphur dioxide into a petroleum-bearing formation, either in liquefied form or as a fluid in admixture with water or liquefied light petroleum hydrocarbon or alcohols, with the second step of injecting an aqueous backing drive which may comprise water alone or water acidulated by a minor proportion of dissolved sulfur dioxide, to drive petroleum to a recovery well, to generate in-situ carbon dioxide, calcium and magnesium bisulfites as well as surface-tension modifying substances, all to improve displacement of petroleum from rock pores.

---

This application is a continuation of Ser. No. 350,838 filed Mar. 10, 1964, and now abandoned.

This invention relates to improvements in methods of recovering oil from petroleum-bearing earth formations by injecting fluids thereinto under pressure to flush oil from the rock pores for recovery at one or more output wells.

Under the provision of 35 U.S.C. 119, this application is entitled to the benefit of the Sept. 4, 1963, filing date of Canadian application Ser. No. 883,813.

More particularly, the invention relates to improved flooding processes for secondary recovery of petroleum employing sulphur dioxide in liquefied form as a flooding agent or as a constituent thereof. According to the invention sulphur dioxide may be injected either as a bank of primary drive medium or in solution in a suitable fluid to provide a drive agent for formation oil and connate water.

By the practice of the novel method of the invention large increases in recovery of petroleum from an oil-bearing formation may be obtained, and in addition the permeability of dolomitic or limestone formations may be increased concurrently with the production of oil therefrom. In all known formations the injection of sulphur dioxide is found to aid in the displacement of oil from the rock, by physical processes not clearly understood. The chemical activity of sulphur dioxide, producing in-situ compounds in the nature of surface-active wetting agents by reactions with petroleum constituents, may be partly responsible for the improved permeability of a reservoir rock to petroleum. Moreover the reduction in viscosity of crude oil having even a small content of sulphur dioxide dissolved therein aids in the migration of petroleum under drive conditions in a recovery operation.

It has become conventional practice to resort to the use of a drive fluid under pressure to mechanically sweep out the oil remaining in formation pores after natural gas pressure falls below a value at which an economical production rate is maintained. Secondary recovery is also regularly practiced early in the life of a producing field to maintain formation pressure. Normally according to the process, one or more input wells are drilled into the formation, or previously producing wells are utilized, having predetermined spacings from an output well or wells tapping the desired oil-bearing formation. When an immiscible driving fluid such as water is employed, capillary forces and surface tension phenomena within the reservoir rock pores prevent recovery of more than a fraction of the petroleum products emplaced. A bank of a liquid primary drive agent miscible with the petroleum and formation connate water is preferably introduced into the formation ahead of a water or gas backing drive agent. The bank of primary drive agent is restricted in radial extent due to the cost of the liquids employed. Liquefied hydrocarbon gases, chiefly propane, have hitherto been favored, followed by gas, fresh water or brine, the formation pressure being kept high throughout the drive to avoid gasification of the primary agent.

Normally the very large volumes and consequent high cost of a liquefied hydrocarbon primary drive agent, the low or even negligible recovery of such agent at the output wells, and the small increase in petroleum recovery obtained by such process, make such operations not altogether successful.

I have found that a superior primary drive fluid useful for secondary recovery of oil from any earth formation including sandstone and calcareous, i.e. limestone and dolomitic, oil-bearing rocks, is either liquid sulphur dioxide alone, or a solution of sulphur dioxide in any fluid miscible or immiscible with formation fluids and petroleum constituents, such as a light hydrocarbon, certain organic liquids or water. Various alcohols, particularly ethyl alcohol and higher alcohols may be employed as vehicles. Moreover, sulphur dioxide may be carried in a composite solvent comprising various mixtures of such liquids.

Sulphur dioxide possesses physical characteristics which render it highly suitable and surprisingly effective as a miscible drive agent, being liquid at relatively low pressures even at any temperature likely to be encountered in producing formations. The solubility of liquid sulphur dioxide in water and in petroleum crudes is high. Liquid sulphur dioxide in fact is soluble in water above a critical pressure which is well below bottom hole pressures usually encountered. It is soluble in light hydrocarbons such as propane under moderate pressure and with ethyl and higher alcohols.

Sulphur dioxide produces a so-called "weak" acid in aqueous solution. The chemical reactions between the sulfurous acid formed and a limestone or dolomite rock produce bisulphites and liberate carbon dioxide, the equilibrium of the reactions at usual reservoir conditions being highly stable. Precipitation is therefore a relatively insignificant possibility, while any $CO_2$ generated assists in reducing the viscosity of the crude in which it dissolves. The solution attack of the rock minerals may proceed according to the following reactions:

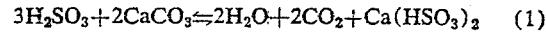
$3H_2SO_3 + 2CaCO_3 \rightleftharpoons 2H_2O + 2CO_2 + Ca(HSO_3)_2$ (1)

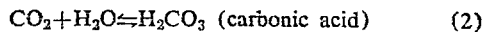
$CO_2 + H_2O \rightleftharpoons H_2CO_3$ (carbonic acid) (2)

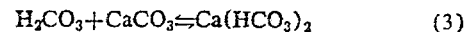
$H_2CO_3 + CaCO_3 \rightleftharpoons Ca(HCO_3)_2$ (3)

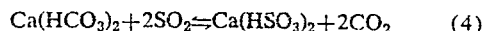
$Ca(HCO_3)_2 + 2SO_2 \rightleftharpoons Ca(HSO_3)_2 + 2CO_2$ (4)

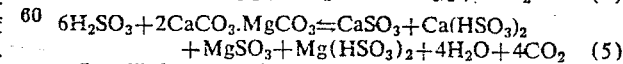
$6H_2SO_3 + 2CaCO_3 \cdot MgCO_3 \rightleftharpoons CaSO_3 + Ca(HSO_3)_2 + MgSO_3 + Mg(HSO_3)_2 + 4H_2O + 4CO_2$ (5)

It will be seen that the reaction products comprise carbon dioxide which is a gas soluble in water and in petroleum, calcium bisulfite which remains a liquid, and magnesium bisulfite which is readily soluble in water. There is evidence that detergent-like substances may play a part in releasing petroleum from the rocks pores, these possibly being formed by reason of chemical activity of the ionized portions of sulphur dioxide aqueous solution with constituents of the petroleum. The foaming of crude oil expelled from test cores under SO₂ drive with water backing suggests that surface tension changes result from such chemical activity which aid in freeing the oil from the rock.

According to my invention, liquefied sulphur dioxide, or sulphur dioxide in solution in a suitable hydrocarbon, alcohol, water or other mutually miscible or immiscible medium, is introduced under pressure into an oil-bearing formation through an injection well or wells, then by means of water or gas injection the bank of sulphur dioxide or primary drive solution containing sulphur dioxide is forced through the formation. Propane or butane may be used as a light hydrocarbon liquid solvent vehicle, preferably carrying a major weight proportion of sulphur dioxide. Methane or air may be used as gas backing drive agents or as intermediate drive agents followed by a water or brine drive. The bank of primary drive agent will inevitably become depleted of sulphur dioxide through reaction in aqueous solution phase with carbonate minerals, if present, while dilution with connate water in the pores of the formation will increase as the bank advances. In carbonate rock reservoirs, the generation of in-situ carbon dioxide is an advantage in sustaining formation pressure and lowering petroleum viscosity, and little if any sulphur dioxide will appear at a recovery well. After water breakthrough at the input well or wells, the drive is continued to recover oil and water together, until an economic limit for the water/oil ratio is reached. Such ratio will be significantly larger than 1:1, and may approach 20:1 or higher ratio depending on the cost of the flooding operation and the rates of flow from output wells.

In a modification of the invention, where the formation permeability is sufficiently high upon completion of the drive of the primary bank, the bottom hole pressure is reduced to a few pounds per square inch or even down to a few ounces, to allow gaseous sulphur dioxide, petroleum gases, methane, air, carbon dioxide, etc. to propel the fluids including oil out of the formation, in a "blowdown" operation. Such operation may be effected at the input well or wells also, in addition to recovery at output wells.

The flooding drive may be repeated as often as desired, and in carbonate rock reservoirs a succession of drives may be necessary where the formation is initially tight, i.e. has a low permeability to oil, so that the permeability at the output wells may be raised to a practicable value for higher production rates, as disclosed in my co-pending application Ser. No. 350,837 filed Mar. 10, 1964, now U.S. Patent No. 3,326,289.

In carrying my invention into practice for effective oil and gas recovery from a petroleum-bearing formation, and particularly from partially depleted petroleum reservoirs, the requisite amount of sulphur dioxide may be introduced by suitable pressure pumps into the well bottom of an injection well or wells penetrating the formation. The sulphur dioxide may be pumped as dry gas which is led by a small diameter line of tubing down a well casing, the casing being packed above the discharge point to prevent any sulphur dioxide from entering the upper part of the casing. At typical formation pressures, the sulphur dioxide liquefies under moderate input pressures and such liquefaction process is continued until a sufficient bank of the liquid has been injected.

Where sulphur dioxide is initially procured as a stored liquid in pressure storage tanks the liquid may be pumped either alone or with a solvent vehicle into the formation. If it is intended to use a solvent in which sulphur dioxide is soluble, for example water, propane, butane or alcohol, this solvent may be injected either before or after the injection of liquid sulphur dioxide or alternately therewith, allowing the substances to dissolve into each other at their interfaces.

Since pure dry liquid or gaseous sulphur dioxide is non-corrosive, it is preferable to inject the material by a small diameter tubing directly into the well bottom, and to comingle and dissolve any solvent vehicle in the well bottom by pumping such vehicle down by another tubing. The latter may advantageously be the well casing itself, in order to avoid corrosion of the casing above the tubing-casing packer employed to close off the upper part of the well near the bottom. The backing drive media are then pumped down the casing at a desired rate, to force the sulphur dioxide-rich primary band radially outwardly from the input well or wells through the formation.

The volume of sulphur dioxide liquid injected will generally be a small fraction of the total pore volume of the formation to be flushed, so that the advancing bank will measure from a few inches to a few feet in radial extent at a distance of 50 to 100 feet from the injection well. The volume required may be computed, using a factor in the range 0.001 to about 0.3 times the pore volume of the formation to be swept. The injection pressures may be anywhere in the range from 100 to about 5000 p.s.i.g. in the formation, depending on the character of the rock, formation depth and formation pressure.

A water or brine backing drive may be acidulated by dissolving a small percentage of sulphur dioxide therein, ranging from about one part per million by weight to several hundred thousand parts per million, to reduce the work of pumping and in carbonate rock formations to leach flow passages and channels slowly along the formation. To produce the largest possible fraction of the oil contained in the formation, the water or gas drive is completed while maintaining a bottom hole and formation pressure at least of the order of 560 pounds (gauge) until the water/oil fluid ratio of fluids produced exceeds about 1:1 or if warranted, 10:1 to 20:1. On conclusion of the final flooding if the formation pressure may be lowered, the bottom hole pressure at the recovery wells is reduced as by pumping at the level of the formation and the formation pressures are allowed to fall gradually until sulphur dioxide gas begins to be evolved with the fluids recovered. Additional water backing drive may be injected until a further limiting ratio of water/oil production is reached.

The invention may be the better understood by reference to the test data and tables hereinafter presented and to the accompanying figures of the drawing forming part of this specification, wherein.

Figure 1:
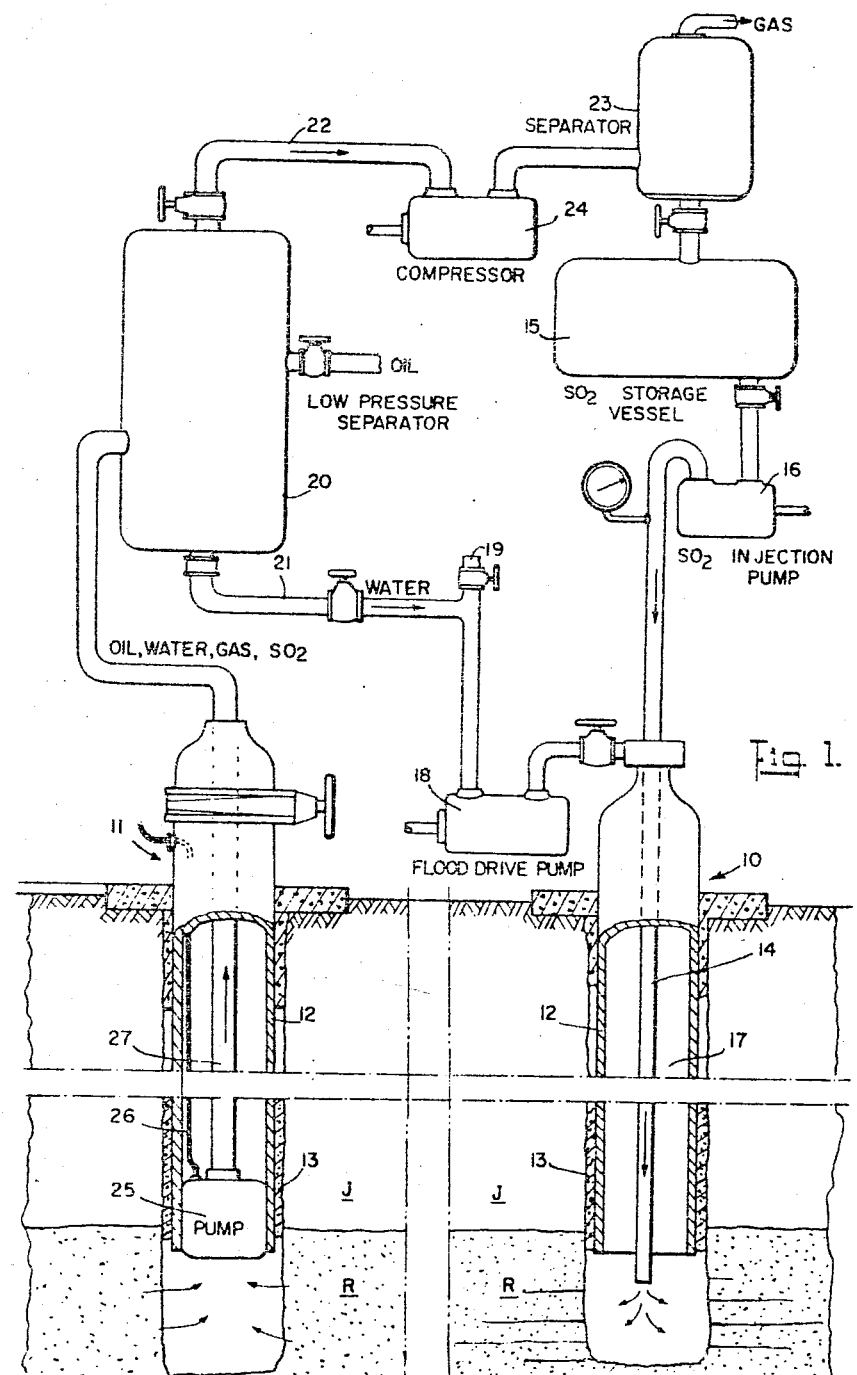
FIGURE 1 is a diagram showing one form of apparatus for injection of sulphur dioxide into a formation through an injection well and for recovery of oil and gas from an output well.

An installation for the injection of sulphur dioxide and recovery of oil and gas from a formation, employing one input and one output well is illustrated by FIGURE 1, wherein an input well 10 penetrates an oil-bearing formation R as does an output well 11 spaced suitably therefrom by a distance which may be from about 100 feet to a half mile or more. The wells have casings 12 entering or communicating with the formation and have a cemented seal 13 placed between the casing and the earth formation J overlying the oil-bearing formation to seal off the latter from layers above it.

Injection well 10 includes a tubing 14 terminating in the well bottom and connected with a sulphur dioxide supply 15 through pump 16. The annular space 17 is connected through pump 18 with a water supply or a supply of gas or other fluid (not shown) fed into line 19.

The chemical activity of weak aqueous solutions of sulphur dioxide requires that all containers, pumps and ducts with which it will come into contact should be made of materials capable of withstanding its corrosive effects. Pure dry sulphur dioxide gas or liquid is not corrosive, and may be safely handled in copper lines with copper or brass fittings, but very small amounts of water vapour in $SO_2$ gas, or very small amounts of dissolved sulphur dioxide in water, are highly corrosive mixtures. Certain stainless steels are incapable of resisting corrosive attack by these mixtures. Valve seats and plugs, piping, fittings, gauges and control elements may be fabricated of or lined with lead, plastic, or with an alloy such as "Hastelloy," "Stellite" or Monel metal, which are resistant to corrosive action by $SO_2$.

Oil and gas recovered at the output well 11 is led into a separator 20, which preferably reduces the pressure on the fluids to a low value to remove gaseous materials. Recovered water may be fed by line 21 to supply the pump 18 for backing drive, while any released gas, including gaseous sulphur dioxide, is led by line 22 and compressor 24 to a high-pressure separator 23. Liquefied sulphur dioxide is returned to the supply 15 for re-use.

Where conditions require, a pump 25 such as an electrically driven unit powered from a line 26 may be operated to lower the formation pressure as desired, to a pressure below the vapour pressure of $SO_2$ at the formation temperature. The pumped products may be passed through a run of corrosion-resistant tubing 27 inside the casing 12, particularly in a recovery operation from a sandstone reservoir, where the acidity of the water would rapidly destroy the casing.

In an operation where water recovered from an output well carries substantially no dissolved $SO_2$, as when recovering products from a carbonate rock reservoir, the injection may be made into the annular space 17 inside casing 12 of a well 10 and any additional agents desired may be introduced by line 19. Where the water is sour the water backing drive preferably is injected through tubing string 14, and space 17 is kept filled with an inert substance such as methane, air, propane, or sweet water to prevent entry of the corrosive solution from below.

Figure 2:
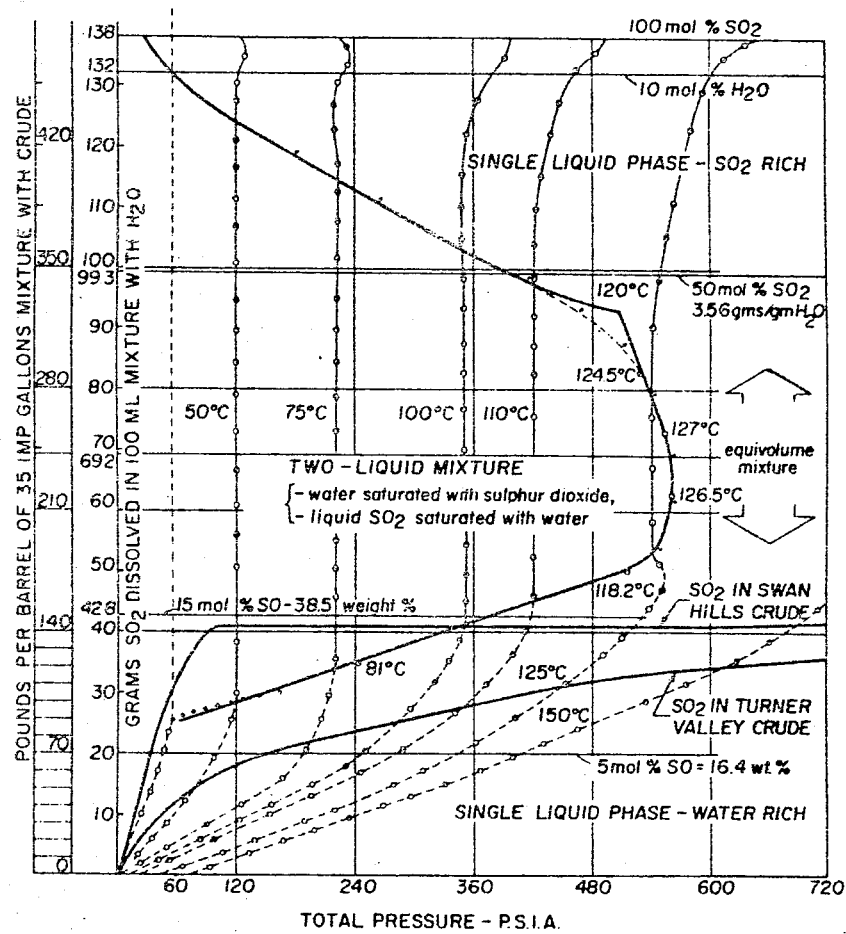
FIGURE 2 is a graph showing solubility of sulphur dioxide in water and a family of bubble-point curves for the mixture, and also showing solubilities of two types of crude oil for $SO_2$.

It will be apparent in the solubility diagram, FIGURE 2 that at moderately high temperatures such as exist in deep reservoirs the recovered fluids have a relatively low solubility for $SO_2$ at atmospheric or sub-atmospheric pressures. Consequently a large part of any $SO_2$ recovered from a sandstone reservoir will be stripped in low-pressure separator 20. Referring to the 50° C. line in the diagram, at sub-atmospheric pressure the effluent water from well 11 is capable of holding in solution only a fraction of a gram of $SO_2$ per 100 ml. volume whereas above a pressure of about 560 pounds per square inch in the reservoir any amount of liquid $SO_2$ remains in solution equilibrium. Even in a very hot reservoir rock, i.e. near 100° C., a pressure in excess of about 560 pounds per square inch prevents gasification of $SO_2$ which remains in a single phase solution with the water.

The data in FIGURE 2 also relates to the solubility observed for mixtures of liquid $SO_2$ in two types of crude oils over a range of pressures. The Turner Valley crude is a light, sour crude containing hydrogen sulfide and also a considerable amount of relatively insoluble waxes, having a viscosity at 150° F. of 1.5 centipoises. The Swan Hills crude is a dark sweet crude containing some wax sediment with a viscosity of 2.5 centipoises at 115° F.

On mixing of each of these crude oils with liquid $SO_2$ and sampling the mixture under isobaric and isothermal conditions and analysis for $SO_2$ content, the plots of solubilities were obtained as graphically shown, wherein the concentration of the solution is expressed in pounds of $SO_2$ per barrel of 35 imperial gallons of crude oil. The Turner Valley crude has an upper limit of solubility for liquid $SO_2$ over a range of very high pressures as may be encountered in the reservoir, of about 110 pounds by weight per barrel of 35 imperial gallons of the crude. Tests with Swan Hills crude oil show a slightly higher solution capacity of the crude oil for $SO_2$, about 143 pounds per barrel at 71° F. Other crudes including very heavy, tar-like crudes have been found to have a considerable although lower capacity for solution of $SO_2$.

The system (propane:$SO_2$ liquid) is a single phase solution at the elevated pressures and typical reservoir temperatures of deep wells. The solubility curve is not shown, since at any pressure above the vapour pressure of $SO_2$ liquid for a given temperature the curve is undefinable. The solubility relation of $SO_2$ with liquefied light hydrocarbons is similar, exhibiting complete miscibility.

Figure 3:
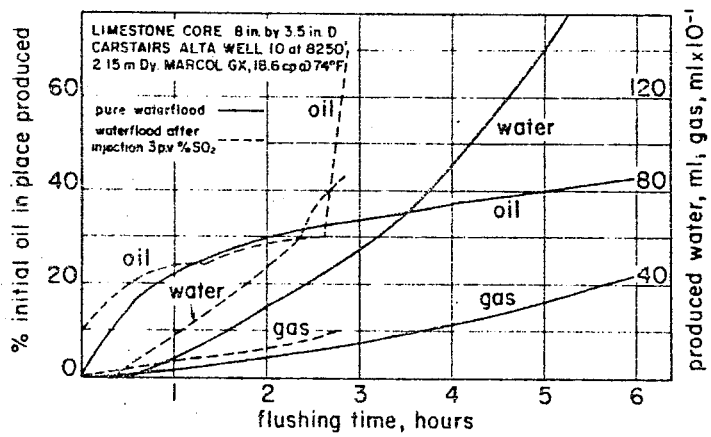
FIGURES 3 through 7 are graph representations of test results obtained on various limestone cores in laboratory injection runs with a primary bank of liquid $SO_2$ and water backing drive.
Figure 4:
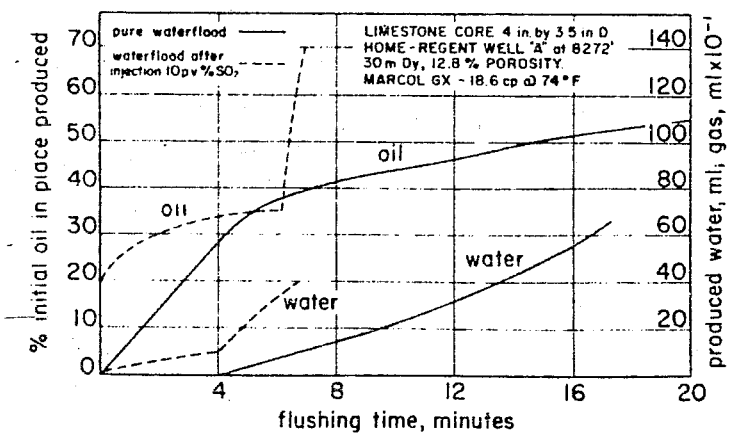

In FIGURE 3, curves are plotted from oil production, gas production, and water injection data obtained from tests carried out on a core to demonstrate the practice of the invention. These data are based on the test carried out as described in Example I which follows. Similarly obtained data are plotted in FIGURES 4 to 7 inclusive, representing results of Examples II to V inclusive.

*Example I*

A section of limestone formation cored from the Carstairs Alberta field, well No. 10, at about the 8,250′ depth, was cut to a diameter of 3.5 inches and a length of 8 inches shortly after coring. This core was mounted in a 5½ inch diameter steel well casing length and the cylindrical surface of the core was sealed by an inert filler occupying the annular space between the core and the casing to prevent migration of the core liquids past the walls. The ends of the core were cut, ground, and sanded smooth flush with the ends of the casing.

The casing containing the core was then mounted between two high-pressure corrosion-resistant steel flanges with flat neoprene gaskets at each end to prevent leakage. The flanges were bolted with steel tie bolts thus compressing the gaskets and steel casing to form a tight seal. The flanges were provided with central apertures connecting with stainless steel tubing. A Heise pressure gauge was mounted and manifolded to the tubing at each end of the core so that both upstream and downstream core pressures could be measured. Further input lines and valves were connected to supply selected fluids from various sources and to receive effluents.

The core was flushed with about eight times the estimated pore volume, using the commercial solvent "Varsol" followed by propane under 130 p.s.i.g. inlet and 75 p.s.i.g. outlet pressures, for 6 hours. The core was then dried for three days by flowing dried air through it at room temperature.

The cleaned core was evacuated by a vane type of mechanical vacuum pump and distilled water allowed to enter the inlet and under the gradient of one atmosphere, with the connection to the vacuum line sealed off. The amount of water taken up was measured and recorded as the effective pore volume. At the same time the water permeability of the core was determined by measurement of the flow rate through it under specific gradients, and was found to be 2.15 millidarcies, hereinafter abbreviated md.

The water-saturated core was flooded with about ten pore volumes of a clear refined light lubricating oil with a viscosity of 18.6 centipoises at 60° F., the effluent being carefully collected. The initial oil-in-place volume was determined as the amount of effluent water displaced by the oil flushing.

Pure water under input pressure of 1300 p.s.i.g. was then injected into the core at a constant pressure drop of 350 p.s.i.g. across the ends, providing a gradient of 43.75 pounds per inch length. The volumes of oil and water recovered in a separator were recorded at intervals for six and a half hours, during which time the temperature was held at 75° F. until a production water/oil ratio of 20:1 had been reached.

The core was reflooded with the same type of oil and the amount of effluent water was recorded, the oil now held by the rock being computed from the original oil-in-place quantity less the recovery from Run 1, plus the volume of water expelled on reflooding.

A second test run consisted in the steps of first injecting liquid $SO_2$ into the oil-saturated core under a pressure of 1300 p.s.i.g., then flooding the core with water when the $SO_2$ injection amounted to 0.03 of the pore space. The temperature was held at 73.5° F. The production of oil, water, and gas was recorded, the gas volume being measured by a gas burette at room pressure. A rapid initial production of nearly 9% of the initial oil-in-place occurred, within a half minute. The flooding water was observed to break through the downstream end of the core in about 17 minutes, while the oil recovery tapered off during this interval. The water throughput reached a water/oil ratio of 10:1 after two hours and forty minutes at which time the amount of recovered oil was a little less than for the preceeding test under pure water flood of Run 1.

The water drive was shut off, and the effluent end of the core was depressurized to atmospheric pressure by increments, while the gas, oil and water produced during the blowdown was recorded. More than half of the total oil recovered was produced on blowdown, and very little water or gas. All the production of oil on blowdown occurred in the last stages of depressurization, especially in the range of outlet pressures from 50 p.s.i.g. down to 0 p.s.i.g.

The amount of oil produced from the core by the $SO_2$ liquid flood with water backing was 67% of the oil initially in place as against 42.5% recovered by straight water flood, i.e. an improvement of 50% in production. Some $CO_2$ gas was liberated but no sulphur dioxide was apparent in the gas. At breakthrough a slight yellowing of the effluent water was noted.

Still larger quantities of liquid $SO_2$ injected as a bank of primary flooding agent are beneficial, as demonstrated by a further experimental secondary production test in the laboratory wherein a liquid volume of $SO_2$ equal to 0.1 pore volumes of the core was injected, as set out in the following Example II.

*Example II*

Another limestone core, taken from the Home Regent well "A" of the Swan Hills Alberta field at a depth of 8272 feet, was cleaned using n-pentane, and dried as in Example I, and its porosity and permeability to water were determined as for the core of Example I. These measured 12.8% and 30 md., respectively, the latter being a relatively high permeability for limestones.

The core was saturated with water and flooded with Marcol GX refined oil as in Example I. Run 1 was made using distilled water drive injected under a pressure of 950 p.s.i.g. against a back pressure of 920 p.s.i.g., providing a gradient of 7.4 pounds per square inch per inch of core length. The water flood produced oil rapidly for the first four minutes, after which the water broke through. The oil production rate fell to about a third of its value prior to breakthrough, and held steady, until the run was discontinued at a water/oil production ratio of 20:1 which was reached after a total flooding time of 19 minutes. The recovery amounted to 53.5% of the initial volume of oil in place. The effluent water appeared milky, showing evidence of some emulsification.

The core was cleaned and dried in prepaartion for Run 2 and the water permeability was observed to have dropped to 25 md. as a result of the water flood of Run 1, as was expected.

An injection of liquid $SO_2$ amounting to 10% of the pore volume was injected into the core under inlet pressure of 975 p.s.i.g. at 73° F., while outlet pressure was held at 950 p.s.i.g. The water flow was very slight for four minutes, after which it increased to a high rate, exceeding the flow of oil.

Depressurization of the effluent side of the core with the inlet side closed off was regulated by increments. The blowdown produced as much oil in one minute as had been recovered in the first six minutes. The blowdown recovery oil was dirty and brown in colour, apparently suspending fine sediments from the rock.

After immediate cleansing of the core, it was found that the water permeability had risen to 250 md., indicating that the contact with $SO_2$ liquid in the presence of water had opened up flow channels. It will be seen from an inspection of data in FIGURE 4 that very rapid displacement of the flooding fluids and rapid recovery of oil resulted from the process.

The injection of $SO_2$ liquid under temperature and pressure conditions of a deep formation into a core thereof saturated with an actual crude oil produced from the same formation, was shown to be highly successful in increasing secondary recovery of the oil as will next be described in Example III.

*Example III*

A core 5½ inches in length taken from the Home Regent well "B" of the Swan Hills field in Central Alberta at a depth of 8230 feet, was cleaned and dried as in Example II, and saturated with pure water. The permeability was measured as 4.0 md., and the porosity as 13.3% of the core volume.

Figure 5:
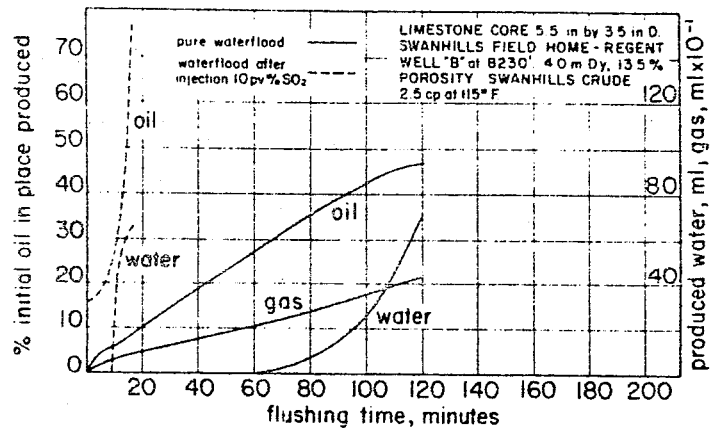

The core was saturated by flooding with a Swan Hills crude oil. In Run 1 as shown in FIGURE 5, the reference water flood showed a high rate of oil and gas recovery when applied at inlet pressure of 1100 p.s.i.g. and a pressure drop between the ends of the core of 150 pounds per square inch. Water breakthrough did not occur until 60 minutes after the test began, and rose rapidly, appearing as an emulsion with the oil. Depressurizing the effluent side of the core with the water drive shut off produced a little gas but no significant amount of fluid.

The core was reflooded with the crude oil, and Run 2 was made, consisting of the step of injecting a volume of liquid $SO_2$ equal to 0.10 pore volume, followed by the step of forcing water through the core sample. An immediate production of oil surged through, amounting to 17% of the initial oil-in-place, and the rate of oil flow steadied for six minutes before rapidly rising. Water broke through after eight minutes, which contrasts with the breakthrough at 57 minutes for the straight water flood. After 10 minutes, the core was depressurized at the effluent end by increments with the inlet end sealed off which rapidly produced oil in an amount exceeding the recovery in the entire water flood of Run 1. The total oil recovery from the rock was astonishingly high, amounting to 77% of the oil initially in place and its recovery was effected in a short space of time, indicating that a high flow rate would be reached under field conditions. The water produced was yellow, and the gas rate following breakthrough was high, some sediment appearing in the oil.

After Run 2 the effective water permeability of the rock sample was found to be 4.2 md., indicating that no substantial increase in permeability or channeling had occurred. It is significant that the flow rates, as indicated by a total flooding time of 17 minutes, were greatly increased as compared with Run 1, suggesting that freerer flow paths had been opened up.

The beneficial effects of injection of $SO_2$ as a bank of primary drive agent into limestone cores for water flood drives of a dark sour crude oil containing hydrogen sulfide and a wax not soluble in n-pentane, as exemplified by Turner Valley crude, are apparent from the results of Example IV which follows.

Example IV

A limestone core from the Home Harmattan well of the Harmattan field, taken from the 8570 foot depth, was cut to a length of 7 1/16 inches. The core was cleaned with "Varsol" solvent and dried, then water saturated as described above. A porosity of 14.5% and a water permeability of 6 md. were measured. The core sample was heated to 150° F. and was oil-flooded with Turner Valley crude oil at that temperature.

Figure 6:
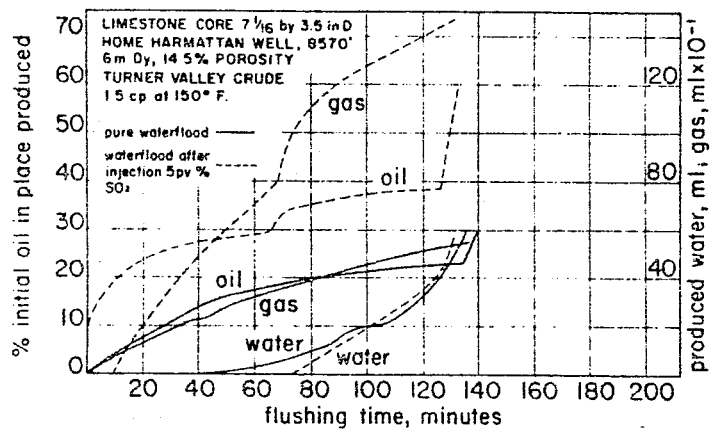
Figure 7:
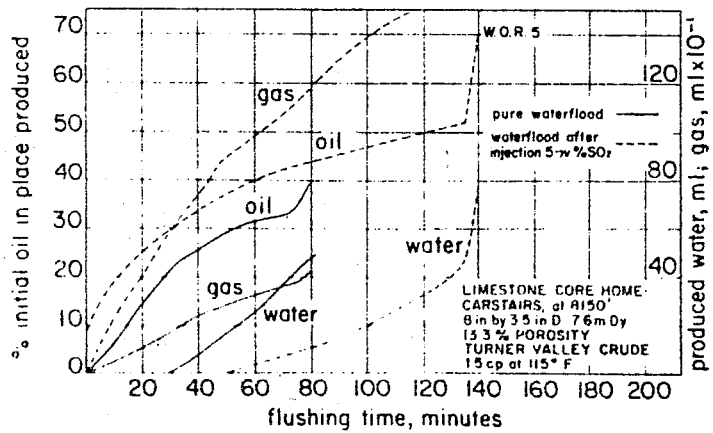

The plot of Run 1 shown in FIGURE 6 shows pure water flooding production results for an inlet injection pressure of 970 p.s.i.g. and a drop over the core length of 20 p.s.i.g. The curves show water breakthrough at 37 minutes, a steady slope for the oil and gas production quantities, a rising water throughput rate, and a large subordinate oil and gas recovery. Some blowdown recovery was obtained, with a total recovery of about 30%.

After reflooding with Turner Valley crude oil, Run 2 was carried out, consisting of an initial injection of 0.05 pore volumes of liquid $SO_2$ at 970 p.s.i.g. follower by pure water backing drive. The initial rates of oil and gas production were high, but decreased and paralleled the production curves of Run 1. The rate of oil production increased sharply just before breakthrough and decreased immediately after water breakthrough, although the water produced closely paralleled that of Run 1. Blowdown recovery was 20% of the rock content.

On cleaning and resaturation with water, it was found that the water permeability of the rock has risen to 9.35 md. from 6.2 md.

This test established that even without the production obtained on blowdown, the injection of a liquid $SO_2$ bank produced 15% more of the oil initially in place than did the pure water flood, and that the total production recovered from the rock including blowdown was twice that recovered by water flooding alone.

In some types of limestone reservoir rock an injection of 5 pore volume percent of liquid $SO_2$ under temperature and pressure conditions of a deep formation followed by a water flood may be effective to produce as much as 70% of the oil initially in place including blowdown recovery, as compared with a maximum recovery of about 40% using conventional water flood, as shown by the following Example V.

Example V

A core taken from the Home Carstairs field at a depth of 8150' was cleaned and saturated with pure water, and found to have a water permeability of 7.6 md. and a porosity of 13.3%. The core was heated to 150° F. and set up for water flooding, taking up 169 cc. The core was flushed with heated Turner Valley crude under pressure, until an oil saturation of 74.6% of the pore volume was reached. Run 1 was made, applying a pure water flood under the same high pressure (950 p.s.i.g.) injection as during oil saturation, with a pressure drop across the length of 8 1/16 inches of 10 pounds per square inch. Data appear in FIGURE 7.

At water breakthrough the oil production showed an abrupt decrease in rate but continued to produce a substantial subordinate production. A relatively high water production rate was noted and the test was carried to a water/oil production ratio of 5:1.

The core was reflooded with the crude oil and Run 2 was made, starting with an injection of liquid $SO_2$ under the simulated deep well conditions. The primary injection immediately produced 8.5% of the oil initially in place, as an amount of $SO_2$ equal to 5 pore volume percent was forced into the core. The water backing drive was carried on until a water/oil ratio of production of 5:1 was reached. Considerable gas was produced as a foam with the oil, and water breakthrough was much delayed. On blowdown a substantial amount of oil was produced, yielding a high total recovery. The permeability of the core to water on re-cleaning and saturating had decreased to 4.7 md.

Figure 8:
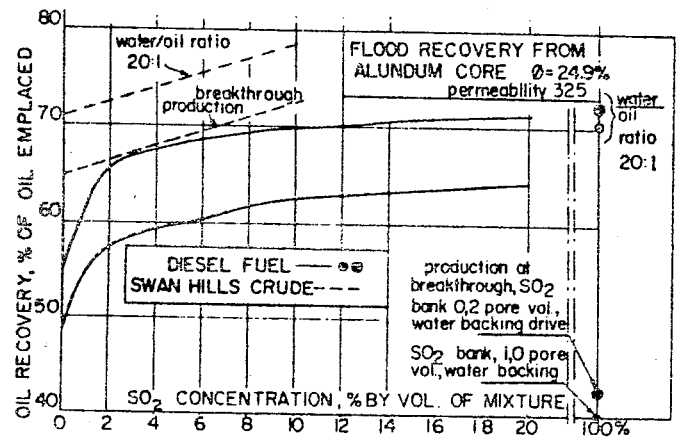
FIGURE 8 shows test data in graph form of improvement in recovery of diesel fuel and of a crude oil from an artificial non-reactive alundum core.

FIGURE 8 shows data obtained by tests according to the method of the invention carried out on non-reactive rock, using an aqueous solution of sulphur dioxide at various concentrations, and alternatively using liquid $SO_2$ as a primary drive agent followed by water backing drive.

The experiments were carried out on a synthesized porous rock made of sintered aluminum oxide (Alundum) particles, with a pore volume equal to 24.9% of its bulk and having a high water permeability of 325 md. The core measured 18 inches long and its cross-sectional area was 0.82 square inch. Injection of all fluids was made under test conditions of a low temperature reservoir in excess of 1000 p.s.i.g. and 78° F.

After initial water saturation, a first series of tests was made with diesel fuel as the emplaced oil, having a viscosity of 5.95 centipoises. The flooding was regulated to force 120 cc. of fluid per hour into the core. Each test of a series was made using a different concentration of $SO_2$ dissolved in flood water, covering the range 0 to 20 percent by volume $SO_2$ mixed with water.

An initial test with pure water flood yielded 48.9% of the emplaced oil at breakthrough and 55.1% at a 20:1 water/oil production ratio. On addition of $SO_2$ the recovery at breakthrough and at the limiting water/oil ratio improved, the rate of improvement being less above 2% of added $SO_2$, but some improvement being still obtained by increasing the strength even at a concentration of 20%, which was a single phase solution. When such high concentration was used a breakthrough recovery of 64% of the emplaced oil was obtained, and at the 20:1 water/oil production ratio the total recovery was 71.7%.

A second series of tests using Swan Hills crude oil and heated cores, with a range of concentrations of aqueous solutions of $SO_2$ as flooding fluids also at 150° F., ranging from 0 to 10 percent $SO_2$ by volume, showed consistent improvement in recovery as the concentration increased. Ultimate recoveries of 68.7% of the oil emplaced were measured at the breakthrough point and 78.5% at the 20:1 ratio of water-to-oil produced, with an applied water flood containing 10 percent $SO_2$ by volume.

The same core was used in further tests using diesel fuel again as the emplaced oil, one test using an initial injection of 0.2 pore volume of liquid $SO_2$ followed by water drive, and a second test using 1.0 pore volume of liquid $SO_2$ followed by water drive.

It will be apparent from the data obtained as shown in the diagram for the 100% $SO_2$ concentration, that recovery at breakthrough is lower than when using pure water or an aqueous solution, and that a slightly higher ultimate recovery is obtained for this oil with the 1.0 pore volume bank, and water backing drive. For a given reservoir sand it may obviously be established by experiment whether it is more economical to use a bank of liquid $SO_2$ as primary drive agent followed by aqueous or gaseous drive, or to use an aqueous flood containing dissolved $SO_2$.

Figure 9:
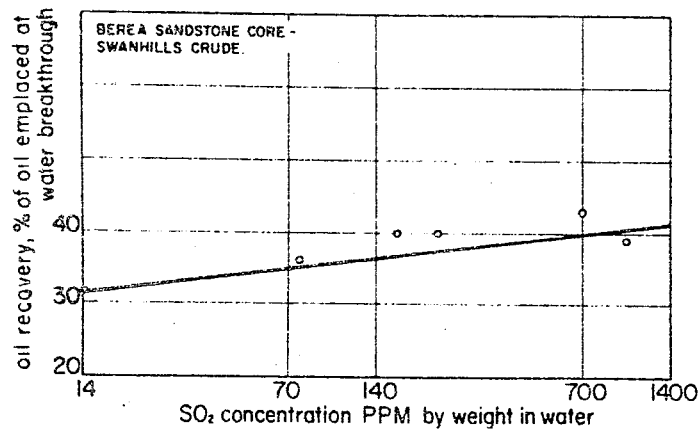
FIGURE 9 shows test data for improvement in recovery of oil from a Berea sandstone core using an aqueous solution of $SO_2$.

A low viscosity crude may, for example, be recovered by a flood water drive having relatively low content of dissolved $SO_2$ from a Berea sandstone or equivalent rock, as shown by FIGURE 9. The graph relates data obtained with a cylindrical core having length and diameter dimensions respectively of 11 inches and 3½ inches. The core was mounted for axial flooding with its cylindrical face sealed, and was injected at a constant high input pressure and a constant rate of 240 cc. per hour through one end face with various concentrations of sulphur dioxide in water. The rock porosity was 18.03% and the computed pore volume was 18.9 cubic inches. Its permeability to water was 1.223 md. After an initial cleaning and water flood saturating the rock, a sweet crude oil, obtained from the Swan Hills, Alberta field, having a viscosity of 3.5 cp. at the test temperature of 80° F., was emplaced in the sandstone by flowing about 6 pore volumes of the crude therethrough. At the beginning of each test the oil content was about 71% of the pore volume.

The graph shows that for increasing concentrations of $SO_2$ the petroleum was increasingly displaced in preference to the connate water, as demonstrated by the fact that only 30% of the initial oil-in-place was flushed out at breakthrough of connate water from the discharge face of the core under a pure water flood. Total oil displacement was higher with acidulated water flooding than with pure water at any water/oil ratio. It is significant that when $SO_2$ is added to flood water in a proportion as low as about one part per thousand by volume, an improved recovery amounting to as much as 50% of total recovery with a pure water flood may be gained, and a lower pressure gradient may reduce the work of injection by a large factor.

Figure 10:
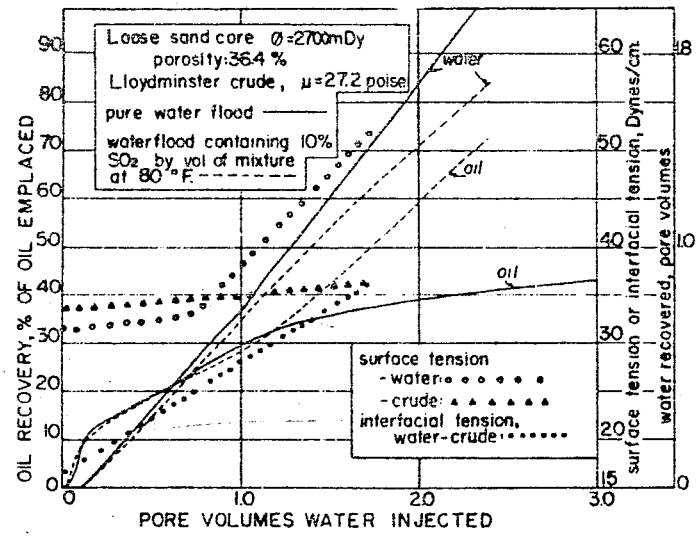
FIGURE 10 is a graph showing improvement in recovery of a heavy crude from a sandstone core under drive by an aqueous solution $SO_2$, and also showing data on surface tension of effluents and interfacial tension between crude oil and water recovered from the core.

It has also been found that the use of an aqueous solution of sulphur dioxide is exceptionally advantageous in secondary recovery of a depleted or depressurized oil reservoir in which the crude oil has a high viscosity. Certain crudes resemble plastic solids although being technically liquids, and have such high viscosity that they are substantially "dead," i.e., have little or no capacity for flowing. As might be expected, such crudes respond poorly to water drive or to drive with known flooding media. FIGURE 10 shows test data for laboratory trials using an unconsolidated sand core having a permeability of 2700 md. and a porosity of 36.4%, the curves for Run 1 showing water production and oil production under pure water flood for a Lloydminster, Alberta crude pumped from a gas-free field having a viscosity of 2720 centipoises at 80° F. The curves for Run 2 show secondary recovery under an applied waterflood containing 10 percent by volume of $SO_2$.

The abscissa of the graph is plotted as pore volumes of flooding medium injected. It will be apparent that recoveries of crude for up to about one pore volume of fluid injected are about the same for either flooding medium, but that a much higher recovery is made with increasing flooding with acidulated water particularly at or above 2.0 pore volumes input.

The graph also includes plots of the variations of surface tension of the recovered oil and produced water effluents, against input volume of flooding medium, and also a plot of the variations of interfacial tension measured for the produced oil with water. It will be observed that the surface tension of the crude, normally 33.5 dynes per cm. at 26° C. test temperature, rose slowly with increased production to 36.0 dynes per cm. and fell to 3.0 on blowdown. The surface tension of flooding water containing 10 volume percent of $SO_2$ liquid in solution, at a pH of 0.88 was measured as 52.2 dynes per cm. at one atmosphere. The water at breakthrough had a lowered surface tension of 31.7 dynes per cm., which probably contained some of the connate water saturating the core, as the pH was 4.60. The surface tension rose abruptly after one pore volume had been injected and the effluent pH fell to 0.91. The water on blowdown was found to have a relatively high surface tension of 64.7 dynes per cm. although it was quite sour at a pH of 1.07.

The interfacial tension of the crude with pure water was measured as 20.6 dynes per cm., and with the acidulated flood water at 18.4 dynes per cm. The effluents exhibited a steadily rising interfacial tension, commencing at 18.0 and reaching 33.2 dynes per cm. The foregoing data, while not conclusive evidence of any specific phenomena, may be interpreted in part as showing a substantial reduction in the resistance offered by a crude to displacement through the sand in accordance with the drop in surface tension of the acidulated water from 52.2 dynes per cm. at the input to 32.9 or less in the effluent. Undoubtedly the physical phenomena attending the migration of connate water, oil constituents, and flooding medium through and along the tortuous and restricted pore openings are complex and probably inexplicable.

The interpretation offered for the foregoing data is in no way intended to confine the scope of the present invention, which has been shown to provide substantial and even unprecedented improvements in recovery of widely differing types of petroleum from various kinds of reservoir rock.

It has been shown in the foregoing description that the injection of sulphur dioxide as a pure liquid, or as a solution in any proportion in a bank of water under pressure or a bank of liquefied light hydrocarbon vehicle as a primary drive agent and followed by a backing drive medium, or as a solution in a water flooding drive alone, is efficacious for the purpose of increasing the ultimate recovery of oil from the reservoir rock. While the invention has been particularly described for a recovery operation using spaced input and output wells, it is to be understood that the invention is not limited to such recovery method, but may also be practiced with a single well. Such single well may be either a newly drilled well penetrating an oil-bearing porous formation or a well from which production has been obtained for some time, and the formation pressure may be high or low including near-atmospheric pressure conditions. The method of the invention may be practiced as described, injecting either liquid $SO_2$ or a vehicle solvent containing $SO_2$ in a single phase solution followed by a backing medium, or by injecting an aqueous solution of $SO_2$ alone. When the amount of injected backing medium or aqueous solution has built up the formation pressure, particularly where a gas backing drive such as methane or air follows the primary drive agent or an aqueous flood containing a minor volume proportion of $SO_2$, the formation fluids including any oil and gas may be recovered by outflow from the well, using pumping means if necessary to recover the media.

I claim:

1. In the secondary recovery of petroleum from an oil-bearing earth formation penetrated by at least one injection well and by at least one recovery well spaced therefrom, the two step method which comprises
    (a) introducing liquefied sulphur dioxide into the formation through an injection well to form a bank of liquid sulphur dioxide in the formation adjacent said well and
    (b) thereafter introducing through said injection well a backing fluid comprising water acidulated by a minor proportion of dissolved sulphur dioxide into said formation immediately behind said bank sufficient to drive through the formation to said recovery well, said bank and petroleum displaced from the formation and without cyclical repetition of steps (a) and (b), recovering said petroleum through said recovery well.

2. The method as defined in claim 1 wherein the sulphur dioxide is introduced at the injection well head in gaseous form and the formation pressure at the bottom of said injection well is maintained in the range from 200 to about 5,000 p.s.i.g.

3. In the secondary recovery of petroleum from an oil-bearing earth formation penetrated by at least one injection well and by at least one recovery well spaced therefrom, the two step method which comprises
    (a) introducing a primary drive fluid consisting of a solution of sulphur dioxide in water into the formation through an injection well to form a bank of said solution in the formation adjacent said well and
    (b) thereafter introducing through said injection well an aqueous backing fluid only into said formation immediately behind said bank sufficient to drive through the formation to said recovery well, said bank and petroleum displaced from the formation and without cyclical repetition of steps (a) and (b) recovering said petroleum through said recovery well.

4. The method as defined in claim 3 in which said bank has a volume equivalent to about 0.001 to about 0.3 pore volume of the formation swept by said bank.

5. The method as defined in claim 4 in which said bank is a solution of from 1,000 to about 200,000 parts per million of sulphur dioxide in water.

6. The method as defined in claim 4 in which the backing fluid is water.

7. The method as defined in claim 6 in which the water is acidulated by a minor proportion of dissolved sulphur dioxide.

8. In the secondary recovery of petroleum from an oil-bearing earth formation penetrated by at least one injection well and by at least one recovery well spaced therefrom, the two step method which comprises
   (a) introducing liquefied sulphur dioxide into the formation through an injection well to form a bank of liquid sulphur dioxide in the formation adjacent said well and
   (b) thereafter introducing through said injection well a backing fluid comprising water acidulated by a minor proportion of dissolved sulphur dioxide into said formation immediately behind said bank sufficient to drive through the formation to said recovery well, said bank and petroleum displaced from the formation
and recovering said petroleum through said recovery well.

9. The method as defined in claim 8 wherein the sulphur dioxide is introduced at the injection well head in gaseous form and the formation pressure at the bottom of said injection well is maintained in the range from 200 to about 5,000 p.s.i.g.

10. In the secondary recovery of petroleum from an oil-bearing earth formation penetrated by at least one injection well and by at least one recovery well spaced therefrom, the two step method which comprises
    (a) introducing a primary drive fluid consisting of a solution of sulphur dioxide in water into the formation through an injection well to form a bank of said solution in the formation adjacent said well and
    (b) thereafter introducing through said injection well an aqueous backing fluid only into said formation immediately behind said bank sufficient to drive through the formation to said recovery well, said bank and petroleum displaced from the formation
and recovering said petroleum through said recovery well.

11. The method as defined in claim 10 in which the backing fluid is water.

12. The method as defined in claim 11 in which the water is acidulated by a minor proportion of dissolved sulphur dioxide.

References Cited

UNITED STATES PATENTS

| 2,859,818 | 11/1958 | Hall et al. | 166—9 |
| 2,910,123 | 10/1959 | Elkins et al. | 166—9 |
| 2,968,350 | 1/1961 | Slobod et al. | 166—9 |
| 3,120,262 | 2/1964 | Archer | 166—9 |
| 3,249,157 | 5/1966 | Brigham et al. | 166—9 |

FOREIGN PATENTS

| 696,524 | 9/1953 | Great Britain. |

OTHER REFERENCES

Muskat: Physical Principles of Oil Production, 1st ed., McGraw-Hill Book Co., New York, 1949, pg. 703 relied on.

STEPHEN J. NOVOSAD, *Primary Examiner.*